(12) United States Patent
Dupuis et al.

(10) Patent No.: US 11,727,262 B2
(45) Date of Patent: Aug. 15, 2023

(54) CONFIGURATION OF AN OPTICAL SWITCH FABRIC USING MACHINE LEARNING

(71) Applicant: International Business Machines Corporation, Armonk, NY (US)

(72) Inventors: Nicolas Dupuis, New York, NY (US); Benjamin Giles Lee, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 16/569,496

(22) Filed: Sep. 12, 2019

(65) Prior Publication Data

US 2021/0081776 A1    Mar. 18, 2021

(51) Int. Cl.
*G06N 3/067* (2006.01)
*H04Q 11/00* (2006.01)
*G06N 3/04* (2023.01)
*G06N 3/08* (2023.01)

(52) U.S. Cl.
CPC ............ *G06N 3/0675* (2013.01); *G06N 3/04* (2013.01); *G06N 3/08* (2013.01); *H04Q 11/0005* (2013.01); *H04Q 11/0062* (2013.01); *H04Q 2011/009* (2013.01); *H04Q 2011/0049* (2013.01)

(58) Field of Classification Search
CPC .......... G06N 3/0675; G06N 3/04; G06N 3/08; G06N 3/084; H04Q 11/0005; H04Q 11/0062; H04Q 2011/0049; H04Q 2011/009; H04Q 2011/0039; H04Q 2011/005

USPC .......................................................... 706/25
See application file for complete search history.

(56) References Cited

U.S. PATENT DOCUMENTS

| | | |
|---|---|---|
| 8,149,826 B2 | 4/2012 | Marcondes et al. |
| 9,485,552 B1 | 11/2016 | Dupuis et al. |
| 10,634,851 B2 * | 4/2020 | Steinbrecher ...... H04Q 11/0005 |
| 2014/0133320 A1 | 5/2014 | Stark et al. |

(Continued)

OTHER PUBLICATIONS

P. Dumais, D. J. Goodwill, D. Celo, J. Jiang, C. Zhang, F. Zhao, X. Tu, C. Zhang, S. Yan, J. He, M. Li, W. Liu, Y. Wei, D. Geng, H. Mehrvar, and E. Bernier, "Silicon Photonic Switch Subsystem With 900 Monolithically Integrated Calibration Photodiodes and 64-Fiber Package," J. Lightw. Technol., vol. 36, No. 2, pp. 233-238, Jan. 2018.

(Continued)

*Primary Examiner* — Juan A Torres
(74) *Attorney, Agent, or Firm* — Daniel P. Morris; Lou Percello, Attorney, PLLC

(57) ABSTRACT

An optical switch fabric comprises two or more optical switch elements. The optical switch elements are configured in a topology. A switch control has a plurality of bias control signals. The switch control can address one or more of the optical switch elements and can apply one of the bias control signals to bias of the addressed optical switch element to establish a switch setting. The topology and switch settings determine how each of one of the inputs is connected to each of one of the outputs of the optical switch fabric. The switch settings are determined by a machine learning process which includes a model creation. The model can be made to adapt dynamically during optical switch fabric operation.

20 Claims, 11 Drawing Sheets

(56) References Cited

U.S. PATENT DOCUMENTS

| | | | | |
|---|---|---|---|---|
| 2017/0238075 | A1* | 8/2017 | Dupuis | H04B 10/07955 398/38 |
| 2018/0024957 | A1* | 1/2018 | Nachimuthu | H03M 7/4056 711/170 |
| 2020/0097742 | A1* | 3/2020 | Ratnesh Kumar | G06N 3/0472 |
| 2020/0226421 | A1* | 7/2020 | Almazan | G06V 20/52 |

OTHER PUBLICATIONS

Glick, "The role of integrated photonics in datacenter networks." Next-Generation Optical Networks for Data Centers and Short-Reach Links IV. vol. 10131. International Society for Optics and Photonics, 2017.

M. Abadi, A. Agarwal, P. Barham, E. Brevdo, Z. Chen, C. Citro, G. S. Corrado, A. Davis, J. Dean, M. Devin, S. Ghemawat, I. Goodfellow, A. Harp, G. Irving, M. Isard, Y. Jia, R. Jozefowicz, L. Kaiser, M. Kudlur, J. Levenberg, D. Mane, R. Monga, S. Moore, D. Murray, C. Olah, M. Schuster, J. Shlens, B. Steiner, I. Sutskever, K. Talwar, P. Tucker, V. Vanhoucke, V. Vasudevan, F. Viegas, O. Vinyals, P. Warden, M. Wattenberg, M. Wicke, Y. Yu, and X. Zheng, "TensorFlow: Large-Scale Machine Learning on Heterogeneous Distributed Systems," arXiv:1603.04467 [cs], Mar, 2016.

Rastergarfar et al. "TCP flow classification and bandwidth aggregation in optically interconnected data center networks." Journal of Optical Communications and Networking 8.10 (2016): 777-786.

Shakya et al. "Virtual network embedding and reconfiguration in elastic optical networks." Global Communications Conference (GLOBECOM), 2014 IEEE. IEEE, 2014.

Wang et al. "Scheduling with machine-learning-based flow detection for packet-switched optical data center networks." Journal of Optical Communications and Networking 10.4 (2018): 365-375.

Viljoen et al. "Machine learning based adaptive flow classification for optically interconnected data centers." Transparent Optical Networks (ICTON), 2016 18th International Conference on. IEEE, 2016.

* cited by examiner

CONFIGURATION OF AN OPTICAL SWITCH FABRIC USING MACHINE LEARNING

STATEMENT REGARDING FEDERALLY SPONSORED RESEARCH OR DEVELOPMENT

This invention was made with Government support under DE-AR0000844 awarded by the Department of Energy (DOE). The Government has certain rights to this invention.

BACKGROUND

The present invention relates to optical switching. More specifically the invention relates to optical switching using machine learning.

Optical switching technologies offer a new paradigm for replacing current electronic packet switching technologies used in today's datacenter, cloud computing, and high-performance computers. These optical switching technologies could provide a large bandwidth enhancement at a potential lower cost. As with electronic switches, an optical switch fabric is made of elementary (optical) switch elements that are arranged in rows and columns, as in a matrix.

Some existing optical switch fabrics are implemented using micro-electromechanical systems or are integrated onto a single chip using, e.g., silicon photonics. Photonic integration is used to provide a smaller footprint, lower cost, and lower power consumption. The large number of optical switch elements in the optical switch fabric need to be controlled for proper operation.

Some optical switch fabrics include a plurality of optical switch elements in an N×N arrangement that has N inputs, N outputs, and S≥2 stages. The optical switch element is an on-off device that routes an optical signal from one input to one output. In some embodiments, the input/output port configuration of the optical switch element may be 1×2, 2×2, or 2×1 depending on switch matrix arrangement. Optical switch element can include a bias control.

Photodetectors can be configured to measure optical power at the respective outputs of the plurality of switch elements. A processor can use the optical power measurements to determine whether the optical power at the output of the optical switch fabric conforms more closely to a predetermined criterion. If the output does not conform, the processor can trigger adjustments of bias controls of one or more of the optical switch elements to change the output signals from optical switch fabric output.

An optical switch element is often operated as an on/off device. However, the optical switch must be set to the right bias point using an analog bias controller which enables a user to continuously vary the output intensity of the switch. For example, in the case of a Mach Zehnder switch (MZS) element, one might want to set the device at the quadrature point (i.e. equal output intensity at both switch outputs). Due to fabrication imperfections, designing a MZS to be at the quadrature point with no applied bias is nearly impossible which is why a bias controller is required. In practice, prior to using the switch, the bias controller has therefore to be tuned in order to set the switch in the desired configuration.

Each of these elementary optical switch elements inside the optical switch fabric should be properly biased or tuned. Proper biasing minimizes error rate, optical crosstalk, and/or signal-to-noise ratio degradation, hence guarantees good signal integrity, as the signal routes through the optical switch fabric. Setting up proper biasing for large optical switch fabrics can be complex, time-consuming, and costly and potentially limits system impact and commercial adoption. Several methods have been proposed for solving this challenge.

One approach demonstrated for optical switch fabrics uses optical power monitors placed after each optical switch element. While this method is robust, it is difficult to apply in cases where the optical switch elements are set at 50% transmission (3-dB point)—for example in Mach-Zehnder based switch matrices.

An improved method monitors power only at the outputs of the optical switch fabric. This method reduces the number of required optical power monitoring cells and enables tunability of the elementary cells to their 3-dB points. In this approach, an optical continuous wave (CW) waveform (with constant amplitude and frequency) traverses the optical switch fabric. Each optical switch element on the optical path is modulated with a distinct low-frequency tone. By monitoring each output of the optical switch fabric and processing the optical waveforms in the frequency domain, the relevant tones and harmonics of the modulated signals can be extracted from each output signal of the optical switch fabric output. The contribution of each switch element can be monitored in real-time, and the settings of the whole optical switch fabric can be optimized. See U.S. Pat. No. 9,485,552 to Dupuis et al. issued Nov. 1, 2016. However, because this method is based on minimizing harmonics of electrical waveforms, in practice, it can be challenging to compensate for non-linearities in system and environment factors that affect the system.

There is a need for an optical switch with minimal optical crosstalk and good, guaranteed signal integrity without regard to system non-linearities. Optical switch fabric tuning needs to be accomplished with reduced cost, complexity, and power consumption.

SUMMARY

Embodiments of the present invention include alternative structures of an optical switch fabric, methods of generating datasets about the optical switch fabric, methods of creating models of the optical switch fabric, and methods of configuring the optical switch fabric either initially or dynamically during operation by using the created models.

The present optical switch fabric comprises two or more optical switch elements. The optical switch elements are configured in a topology. Each optical switch element has a bias, one or more optical switch element inputs, and one or more optical switch element outputs. One or more optical switch element outputs from a first optical switch element connects to one or more inputs of a second optical switch element so that the plurality of optical switch elements optically connect in the topology.

One or more inputs to the optical switch fabric is, or is connected to, one of the optical switch element inputs of an optical switch element at an input of the topology.

One or more outputs from the optical switch fabric is, or is connected to, one of the optical switch element outputs of an optical switch element at an output of the topology.

A switch control has a plurality of (e.g. M×N) bias control signals. The switch control can address one or more of the optical switch elements and can apply one of the bias control signals to the bias of the addressed optical switch element to establish a switch setting. The topology and switch settings determine how each of one of the inputs is connected to each of one of the outputs.

The switch settings are determined by a machine learning process which includes a model creation. The model can be made to adapt dynamically during optical switch fabric operation.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

DETAILED DESCRIPTION

Figure 1:
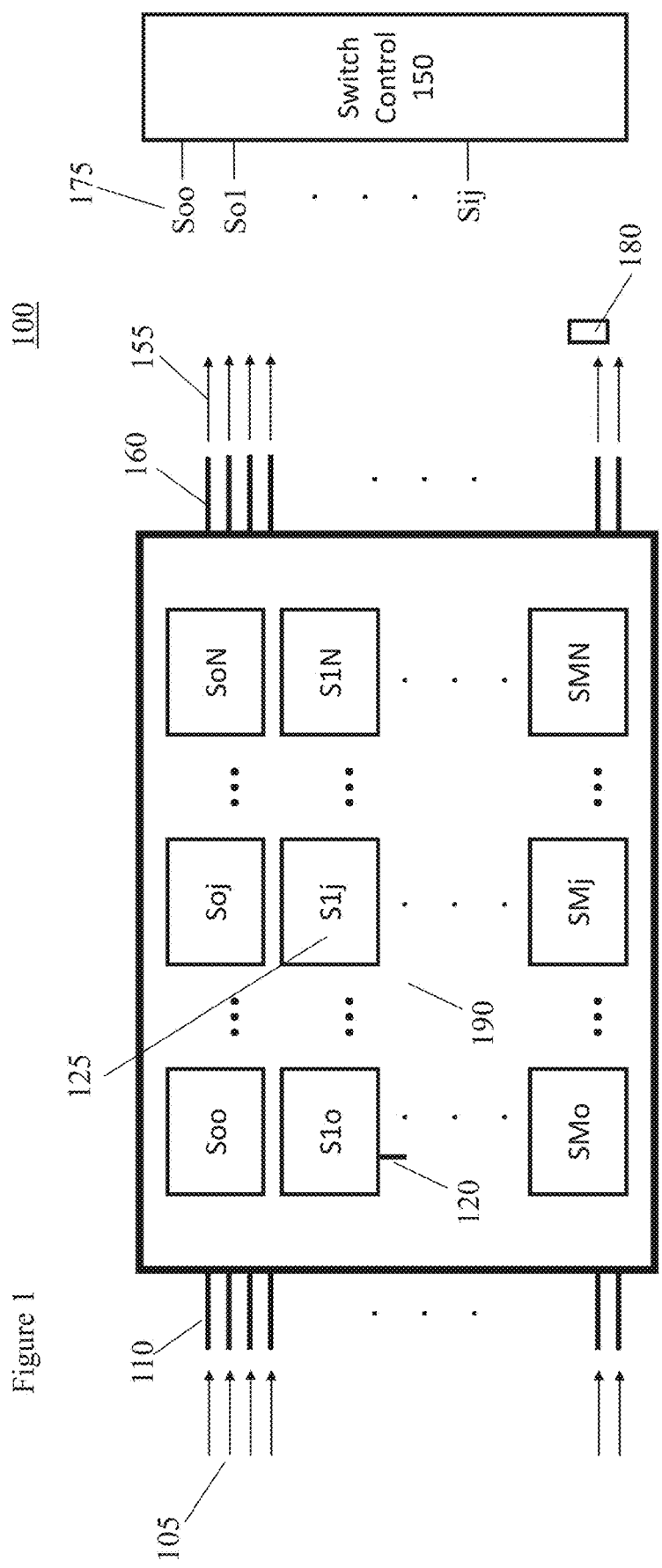
FIG. 1 is a block diagram of an M×N optical switch fabric/matrix that contains many optical switch elements (Sij) that are optically interconnected in a topology.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various layers, apparatus, structures, devices, and/or systems shown in the accompanying drawings are not drawn to scale, and that one or more of these features of a type commonly used may not be explicitly shown in a given drawing. This does not imply that the features not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not be repeated for each of the drawings.

Embodiments of the present invention can be employed in applications, hardware, and/or electronic systems. Suitable hardware and systems for implementing embodiments of the invention may include, but are not limited to, personal computers, communication networks, electronic commerce systems, cloud networks, portable communications devices (e.g., cell and smart phones), solid-state media storage devices, expert and artificial intelligence systems, functional circuitry, neural networks, etc. Systems and hardware incorporating the features of the invention are contemplated embodiments of the invention.

It is understood that these terms might be affected by the orientation of the device described. For example, while the meaning of these descriptions might change if the device was rotated upside down (columns and rows reversed, etc.), the descriptions remain valid because they describe relative relationships between features of the invention.

Embodiments of the present invention include an optical switch fabric/system and machine-learning based method for optimizing and configuring the settings of the optical switch fabric.

In some embodiments, the method consists of building a large experimental dataset that includes measured outputs of the switch for different random configuration settings. The dataset is used to create a model. The model is based on machine learning, which in some embodiments the learned features can be optical switch fabric outputs and labels can be the configuration optical switch element settings, e.g. biases of the optical switch elements.

In some embodiments during operation of the system, the model is used to infer the biases of the optical switch elements of an optical switch fabric configuration to obtain desired outputs given one or more inputs.

Compared with the previously described existing solutions, the present method is easier to implement as it requires less power monitoring circuitry. The invention does not rely on signal processing which can be affected by non-linear operation of the switch. In addition, any output configuration can be set. For example, using the present method the switch can easily be configured in unicast, multicast, or broadcast modes. In multicast (broadcast) mode, the incoming traffic from the network can be sent to multiple (all) destinations (and therefore multiple outputs of the optical switch). Some switch elements might then have to be set as power splitters rather than on/off elements, which would be accomplished by altering the applied control signal.

The machine-learning model effectively handles non-linearities in the system as well as any imperfections in the switch fabric, e.g. related to fabrication defects. Further, the model can also account for other critical features such as the temperature of the circuit and/or effects of changes in the surrounding environment.

Referring now to the Figures.

FIG. 1 is a block diagram of an M×N optical switch fabric/matrix 100 that contains many optical switch elements (Sij), typically 125, that are optically interconnected following some topology 190. Each optical switch element 125 can be separately addressed and controlled using controller bias control signal 175 from an internal or external switch controller 150.

In some embodiments, the switch fabric matrix 100 has N number of inputs 110. An input signal 105 is applied to each input 110, respectively. The switch matrix 100 has N number of outputs 160. An output signal 155 is outputted from each output 160, respectively.

In some embodiments, a switch controller 150 has M×N bias control signal outputs 175 each capable of providing a bias control signal 175 to the bias control 120 of one of the optical switch elements 125, respectively. In alternative embodiments, where the switch fabric matrix 100 topology 190 does not have M×N optical switch elements 125, other numbers of bias control signal outputs 175 are envisioned. The bias control signal 175 is determined using the processes described below and can be used both in the model creation and the optical switch fabric 100 operation. In some embodiments, the switch controller 150 has the capability of separately addressing each of the optical switch elements 125 and reading and individually controlling the bias control 120 dynamically during optical switch fabric 100 operation.

The optical switch fabric 100 routes N input signals 105 from N input physical ports 110 to N output physical ports 160. In some embodiments, the switch controller 150 configures the optical switch fabric 100 in a state that can be defined and dictated by another higher-level controller (not shown).

A "state" of the optical switch fabric 100 means a mapping of the N input ports to any of the N output ports. For example, in a 4×4 switch fabric, a valid mapping would be a direct connection between the input ports (110) 1, 2, 3, and 4, and the output ports (160) 1, 2, 3, and 4, respectively. In practice, due to the variations among the different optical switch elements 125, the tuning (bias control) 120 of all the optical switch elements 125 achieving a given mapping can be complicated and cumbersome, especially for large optical switch fabrics 100.

Embodiments of the present invention use a machine-learning method enabling an easy bring-up and set-up of the optical switch fabric 100. The method works best for integrated switches, but some embodiments discussed also have applications for free-space-based optical switches. Some embodiments include an optical switch fabric 100 that can perform continual learning and hence adapt the optical fabric switch 100 in-the-field for a variety of uses. "Integrated" means integrated on a wafer typically silicon, or III-V. "Free space" means that the interconnection between the switch elements are realized using free-space optics (see e.g. MEMS or fiber switches). In some embodiments, continual leaning can be done dynamically during operation. As the factory parameters of the switch might not be ideal for some users, they can be refined "in-the-field" (i.e. in the user environment) using continual learning.

In some embodiments, a continuous wave (CW) optical signal 105 (a signal with constant frequency, amplitude, and intensity) is coupled to any one or more of the switch inputs 110 and a power monitor 180 is coupled to any of one or more of the outputs 160 of the switch 100. Each power monitor 180 measures the optical power of the associated output 160 signal 155. The CW optical signal 105 can be generated using a laser source or a broadband source. The power monitor 180 can be external, or directly integrated on the switch fabric.

The switch outputs 160 configuration can be represented as a N×N transmission matrix with the rows representing the input ports, i, 110 of the switch 100 and the columns representing the output ports, j, 160 of the switch 100. In this representation the transmission matrix element $m_{ij}$ is equal to the optical power measured 180 at the output 160 port j of the switch when the signal 105 (of known frequency, amplitude, and intensity) enters the input 110 port i of the switch 100.

In order to create a dataset, the bias control 120 of each optical switch element 125 in the optical switch fabric 100 is set in a random configuration defined by a random pattern of bias control signals 175 and the output 160 of the optical switch fabric 100 is measured. Adjusting the bias control signals 175 applied to the bias control 120 of one or more of the optical switch elements 125 on a path will affect the output 160 due to a particular input 110. Therefore, the N×N transmission matrix can be defined for each random pattern of bias control signals.

A dataset is generated by running multiple experiments and saving, for each experiment, the optical switch fabric outputs 160 signals 155 and switch settings 275 (e.g., optical switch element 125 bias control signals 175 and/or bias values 120). The optical switch element 125 bias control signals 175 (initially set randomly) may include some voltages that tune and/or activate the bias control 120 of the optical switch elements 125. In some embodiments, the dataset can include data about other parameters such as the temperature of the optical switch fabric 100 and other environmental factors. In some embodiments, the input information is kept constant for each experiment and can be used to normalize the transmission matrix.

Dataset generation is one of functions that can be performed by embodiments of the present invention.

Figure 2:
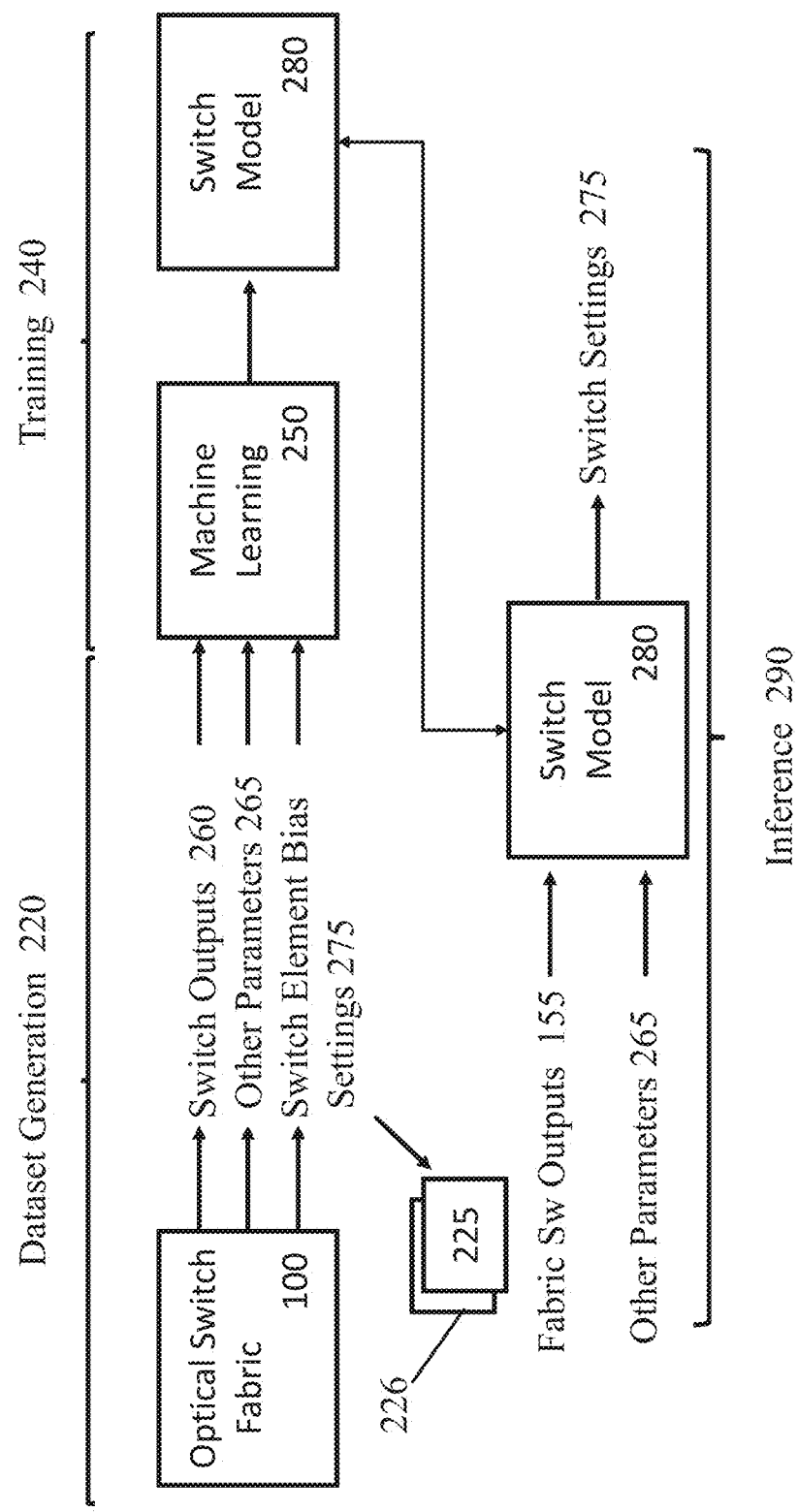
FIG. 2 is a flow chart showing the steps of dataset generation, training, and inference.

FIG. 2 is a flow chart 200 showing the steps of dataset generation 220; training 240, e.g. model development using machine learning; and inference 290, e.g. using the model during optical switch fabric 100 operation.

The dataset generation 220 uses an optical switch fabric, for instance an example shown in FIG. 1. In some embodiments, randomly generated switch settings 275 are applied to the optical switch fabric 100 and the switch settings 275, output data 155, and any other parameters 265 are collected as a record 226 in a dataset 225. In some embodiments, thousands of experiments run and each experiment creates a record 226 added to the dataset 225 during dataset generation 220.

Other parameter 265 information can include operating temperature of the optical switch fabric 100 and/or other environmental information like ambient temperature, humidity, etc.

During training 240 a machine learning engine 250 uses multiple records 226 in the dataset 225 to create a switch model 280 of the optical switch fabric 100. Standard machine learning techniques are used to generate the switch model 280.

In some embodiments, each record 226 of the dataset 225 provides a set of switch settings 275 (e.g. optical switch element 125 biases or bias control signal 175) as labels and associated outputs (155, 260) and optionally other parameters 265 as learned features. The learned features (e.g. outputs (155, 260) and other parameters 265) are applied as inputs to a machine learning function 250, e.g. a deep neural network (DNN) 400, and the outputs of the DNN are compared to label information (switch setting 275 data) in the associated record 226. The difference between the model output and switch setting 275 data is determined. Based on these differences, model parameters, e.g. network parameters, are changed to drive the model outputs closer to the actual output 275. The model outputs are again measured with the new model parameters (network parameters). The process is repeated until the model outputs converge on the values of the switch settings 275 for the record 226 within a given tolerance or validation accuracy. Once convergence is achieved for a plurality of data records 226, the model 280 is complete and the model 280 can be used to infer the switch settings 275 (bias controls 120/bias control signal 175) for the optical switch fabric 100. See below for a more detailed description.

While the prediction of the switch settings 275 given the optical switch fabric outputs 155 is usually the most common and useful, in some embodiments, an inverted network is modelled. In this case, the training learned features would be the switch settings 275 and other parameters 265. The outputs (155, 260) would be the labels used to converge the output of the DNN. Alternatively, if the network can be analytically inverted, training the inverted network is not required.

Figure 3:
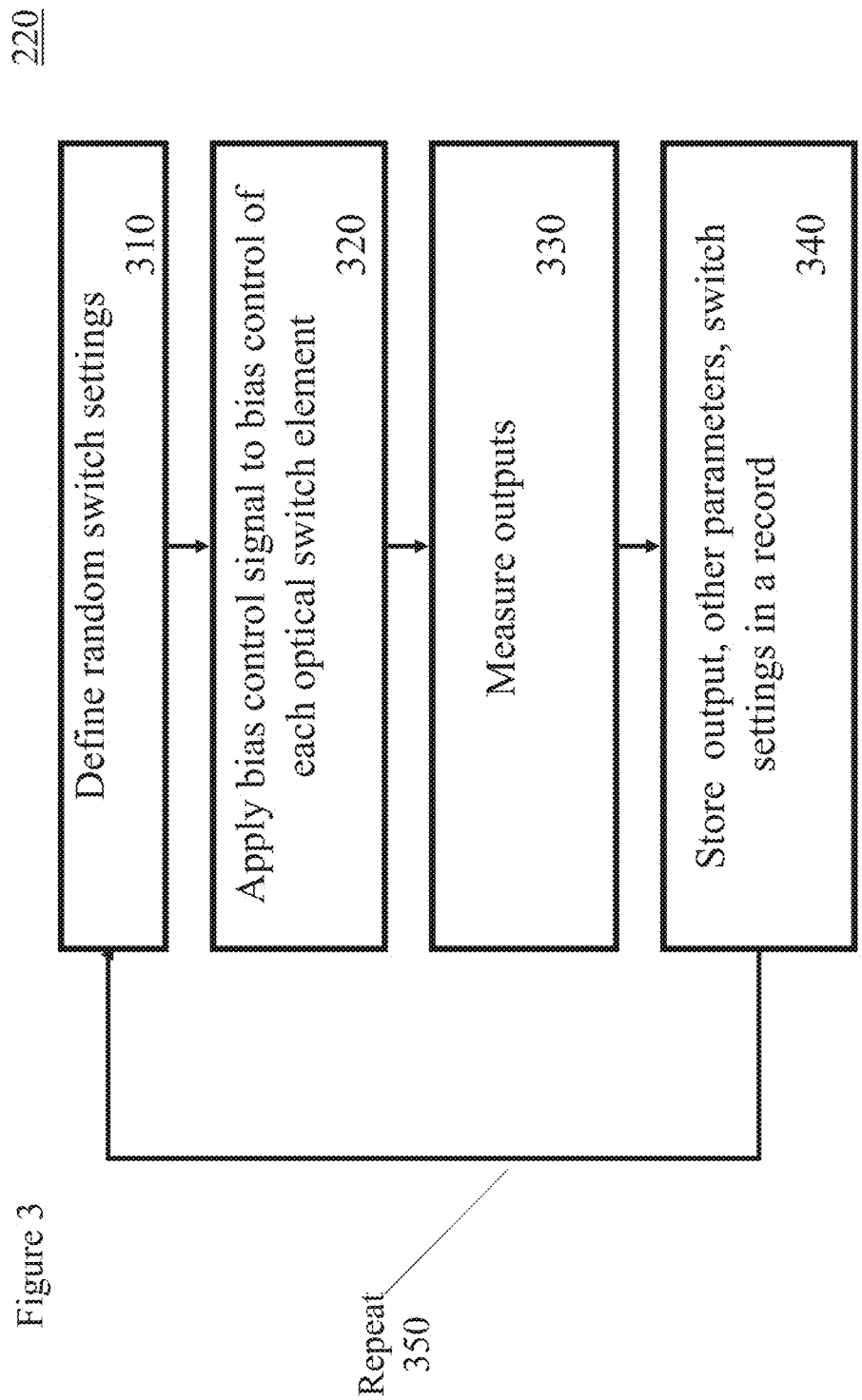
FIG. 3 is a flow chart showing the steps of a dataset generation process.

FIG. 3 is a flow chart showing the steps of an embodiment of a dataset generation process 220.

In step 310 a random set of switch settings 275 is generated. A switch setting 275 is a setting of an optical switch element 125 when a particular bias control signal 175 is applied to the optical switch element bias 120. In some embodiments, the bias control signal 175 is a measure of the switch setting 275.

In step 320 the bias control signals 175 are applied to the respective switch element bias 120 as a switch setting 275 to configure the optical switch fabric 100.

In step 330, at each output, the optical power is measured using integrated photodetectors or external photodetectors.

In step 340 a record 226 is created in the dataset 225 that includes the output power 260 for each output 160, other parameters 265, switch settings 275, and inputs 105.

In step 350 the process 220 is repeated until a large dataset 225 is created. A dataset can be created by changing (e.g. randomly) one or more switch settings 275. In some embodiments, the inputs 105 remain constant. Then for each random switch setting 275 and bias control signal application 320, all inputs 110 are swept through one at a time, and the optical power at each output 160 is measured as each individual input is applied. This creates the transmission matrix {mij} which is stored 340.

Figure 4:
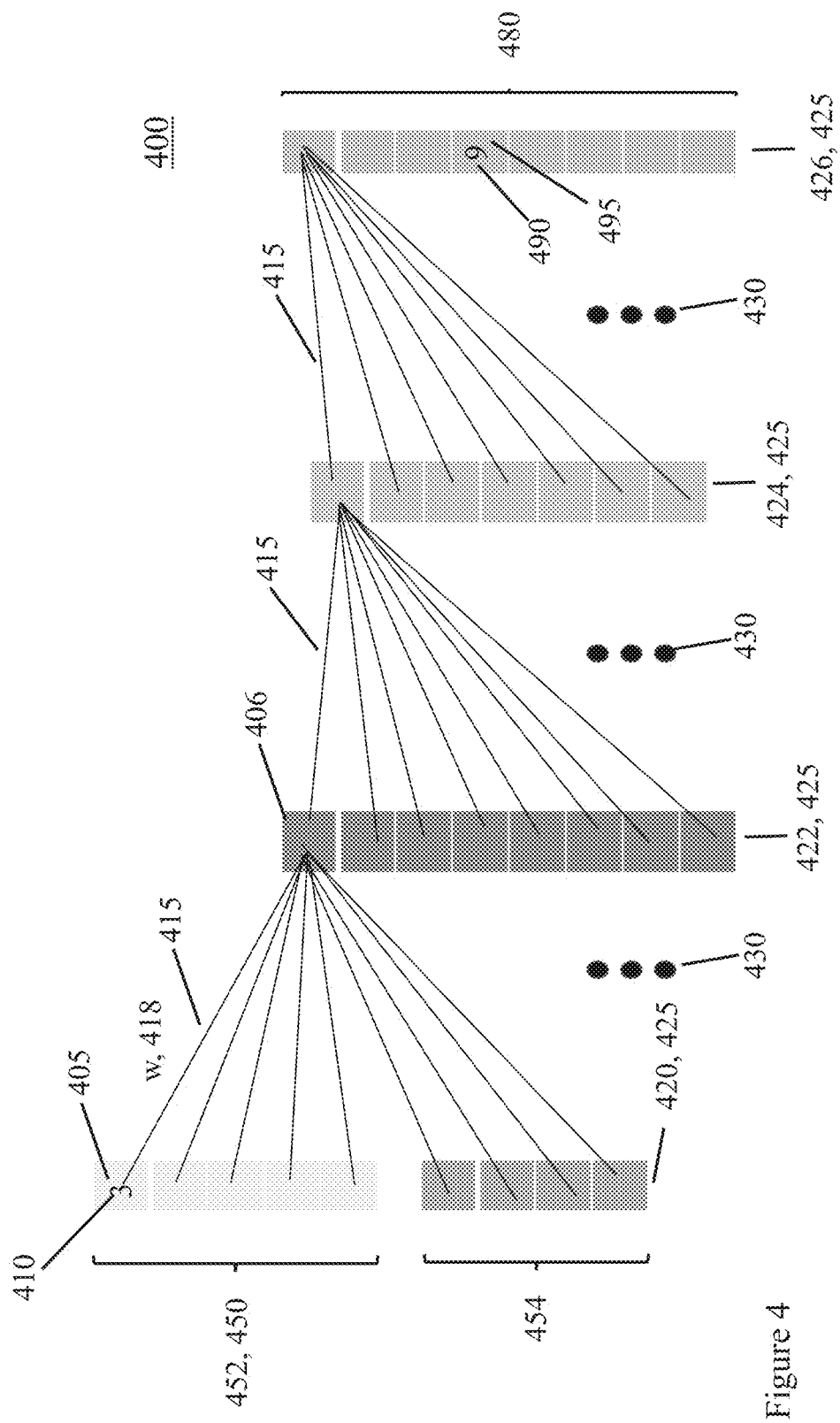
FIG. 4 is a diagram showing one embodiment of a deep neural network (DNN) used for machine learning.

FIG. 4 is a diagram showing one embodiment of a deep neural network (DNN) 400 used for machine learning.

A deep-learning model 400 like a deep neural network (DNN) 400 can be used to build the switch model 280.

DNNs 400 use activations 410 into an input layer 450 and multiple hidden layers (422, 424) in order to drive the output neurons 495 activations 490 of an output layer 426 of the DNN to match a predefined output or labels. In some embodiments, the inputs are learned features learned and the outputs are matched to pre-defined labels. The multi-layer structure of DNNs is very well-adapted for multivariable non-linear functions.

The DNN 400 comprises a plurality of neurons, typically 405. Each of the neurons 405 can store a value called an activation 410. For example, neuron 405 holds an activation 410 of value "3". Most of the neurons and activations have no reference number in FIG. 4 for clarity.

The DNN 400 comprises a plurality of layers, e.g. 420, 422, 424, and 426, typically 425. There is a first layer or input layer 420 and a last layer or output layer 426. Between the input 420 and output 426 layer there are one or more hidden layers, e.g. 422, 424. Each of the layers 425 has a plurality of neurons (405, 406). In some embodiments, the number of layers 425 and the number of neurons 405 in each of the layers 425 is determined empirically by experimentation.

In some embodiments, all the neurons 405 in a previous layer are each connected by an edge 415 to each one of the neurons of a next layer. For example, a typical neuron 406 in a next (hidden) layer 422 is individually connected to each of the neurons 405 in the input layer 420 by an edge 415. In some embodiments, one or more of the edges 415 has an associated weight, w 418. In similar manner 430, each neuron 406 in a next layer, e.g. 422, is connected individually by an edge 415 to every neuron 405 in a previous layer, e.g. 420. The same type of connections 415 are made between each neuron in the second hidden layer 424 to each neuron of the first hidden layer 422 and likewise between each output neuron 495 of the output layer 426 and all the neurons of the second hidden layer 424. Most of these connections 430 are not shown in FIG. 4 for clarity.

In some embodiments, the activation 410 in each neuron 406 is determined by a weighted sum of the activations 410 of each connected neuron 405 in the previous layer. Each activation 410 is weighted by the weight (w, 418) of the edge 415 each connecting the neuron 406 to each of the respective neurons 405 in the previous layer, e.g. 420.

Accordingly, a pattern of activations 410 in a previous layer, e.g. 420, along with the weights (w, 418) on each edge 415, respectively, determine the pattern of activations 406 in the next layer, e.g. 422. In like manner, the weighted sum of set of activations 406 in the previous layer, e.g. 422, determine the activations of each neuron, typically 405, and therefore the activation pattern of neurons in the next layer, e.g. 424. This process continues until there is a pattern of activations 480 represented by the activation, typically 490, in each of the output neurons 495 in the output layer 426.

Therefore, given inputs that cause a pattern of activations 410 at the input layer 420, the structure of the neural network 400, the weights (w, 418) and offsets, b, (described below) determine an activation output pattern that is the activation 490 of each of the output neurons 495 in the output layer 426. The set of activations in the input layer 420 can change and therefore the set of activations in the output layer 426 would change accordingly. The changing sets of activations in the hidden layers (422, 424) are levels of abstraction that may or may not have a physical significance.

The sparsity of the network, the number of layers 425, the number of neurons (405, 406) per layer 425 are all potentially tunable parameters and it is possible that different DNN architectures work best for different optical switch matrix topologies and radix.

The loss function, the learning rate values, the minibatch sizes, and the potential usage of regularization techniques can also be very dependent on the topology 190 and radix of the optical switch fabric 100. (The radix is the number of input/output ports of the switch fabric 100. For example, a N×N switch fabric has a radix N.)

In some embodiments, the input layer 420 is subdivided into two or more sublayers, e.g. 452 and 454, typically 450.

One mathematical representation of the transition from one layer to the next in the DNN 400 is as follows:

$$\begin{bmatrix} a_0^1 \\ a_1^1 \\ \vdots \\ a_n^1 \end{bmatrix} = \sigma\left(\begin{bmatrix} w_{0,0} & w_{0,1} & \cdots & w_{0,k} \\ w_{1,0} & w_{1,1} & \cdots & w_{1,k} \\ \vdots & \vdots & & \vdots \\ w_{n,0} & w_{n,1} & \cdots & w_{n,k} \end{bmatrix} \times \begin{bmatrix} a_0^0 \\ a_1^0 \\ \vdots \\ a_k^0 \end{bmatrix} + \begin{bmatrix} b_0 \\ b_1 \\ \vdots \\ b_n \end{bmatrix}\right)$$

or $$a^1 = \sigma(Wa^0 + b)$$

Where $a_n^1$ is the activation 410 of the nth neuron 406 in the next level, here level 1; $w_{n,k}$ is the weight (w, 418) of the edge 415 between the kth neuron 405 in the current level, here level 0, and the nth neuron 406 in the next level, here level 1; and $b_n$ is the offset value for the weighted sum of the nth neuron 406 of the next level. In some embodiments, the offset value can be thought of as a threshold value for turning on the neuron.

The term a refers to an activation function. For example, the activation function can be the sigmoid function or the rectified linear unit, e.g. ReLU (a)=max (0, a).

For given input 450 parameters, the DNN is trained by finding values for all the weights (w, 418) and offsets, b, that drive the DNN output layer 426 output neuron 495 activations 490 to match a desired output/label within an accuracy or tolerance. In some embodiments, known backward propagation methods are used to find the weight and bias values. The weights (w, 418) and offsets, b, are also know as network parameters or network learnable parameters.

In some embodiments, to start the training, the weights and offsets (network parameters) are set to either random values or some initial value set. Inputs 450 are applied. The output activation pattern 480 of the output layer 426 is compared to a desired result (actual value of the label). For example, a comparison of the activations 490 in each of the output neurons 495 to the desired result (label) through a cost function (e.g. the square root of the sum of the squares of the differences) measures how close the output is to a desired output (label) for a given input (learned features). The cost function is minimized, e.g. by a gradient descent method, through an iterative process to determine how to change the weights and offsets in magnitude and direction to approach the desired output (labels). The weights, w, and offsets, b, are changed, i.e. backward propagated, and another iteration is done. Multiple iterations are done until the output layer 426 produces an output activation pattern 480 that is close to the desired result/label for a given activation pattern (learned features) imposed on the input layer.

The two-layer DNN 400 can be trained to become an optical switch fabric model 280. In one embodiment, the input layer 450 of the DNN would be fed with optical switch fabric outputs 155, and other parameters 265 (learned features), and the network parameters (w, b) would be adjusted to drive the DNN output layer 426 outputs activation pattern 480 to match switch settings 275 (labels).

The optical switch fabric outputs 155, other parameters, and switch settings 275 would come from one of the records 226 of the dataset 225. Multiple records 226 would be analyzed to determine the final model parameters for different operational cases of the optical switch fabric 100.

Figure 5:
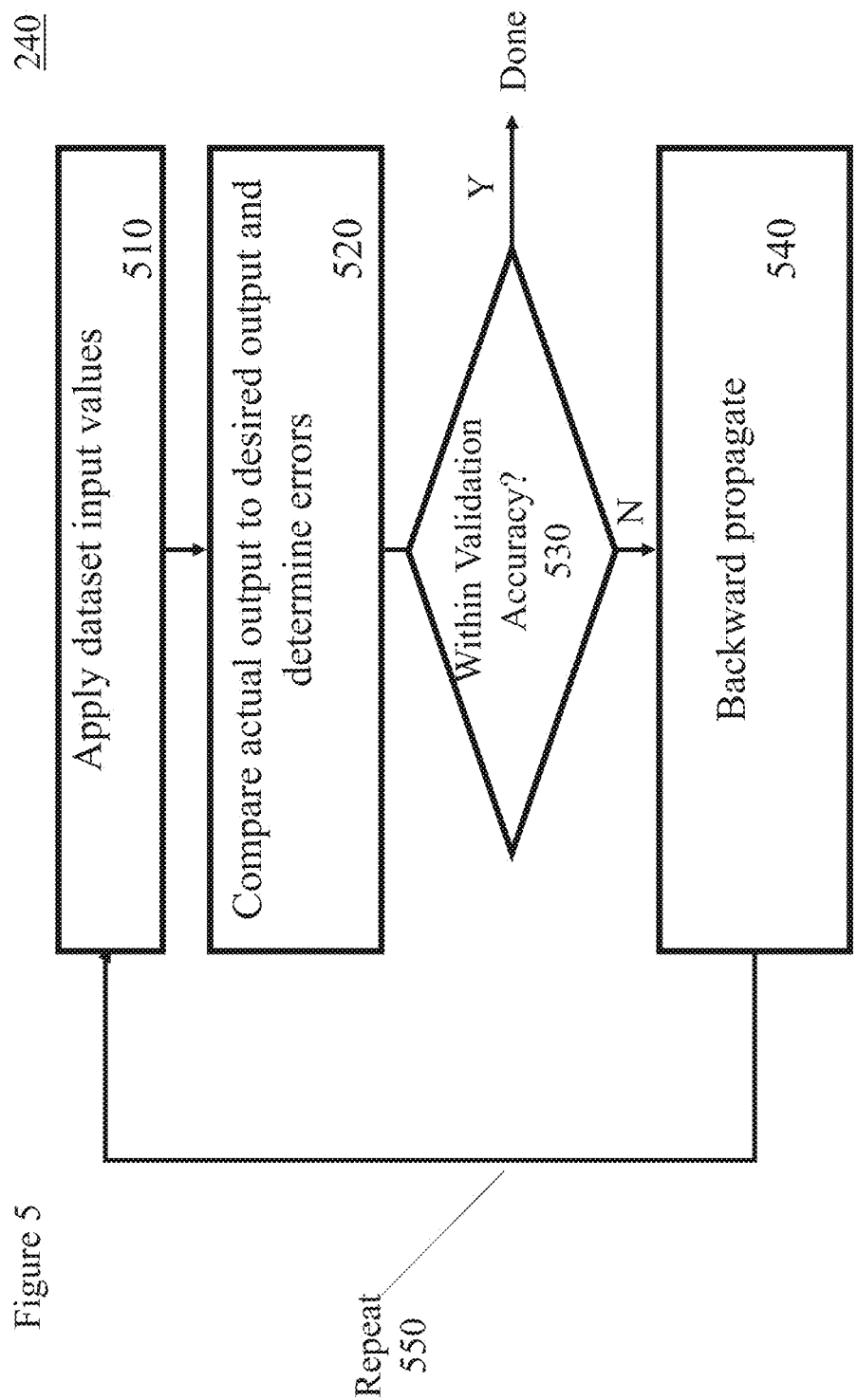
FIG. 5 is a flow chart showing the steps of a process using machine learning and the dataset for training a model.

FIG. 5 is a flow chart of a training process 240 used to train one embodiment of the deep-learning model 400, e.g. DNN.

In step 510 of the training process 240 the weights, w, and offsets, b, of the DNN 400 are set to arbitrary values. DNN input values (or "learned features") 450 from the dataset 225 are inputted into the input layer 420 of the DNN 400. In some embodiments, the DNN input values/features 450 can be separated into groups. For example, a first group of inputs 450 can be output values 155 from the optical switch fabric 100 for a given data record 226 in the dataset 225. A second group of inputs 450 can be "other parameters" 454 from the same data record 226. Other parameters 454 might include temperature of the optical switch fabric 100 during the operation that produced the data record 226.

The activations 410 caused on the input layer 420 by the input values/features 450 propagate through the DNN 400 to produce a DNN output activation pattern 480 at the DNN output layer 426. In this example, each of the DNN output neurons 495 in the output layer 426 has an activation 490 representing a switch setting 275, e.g. the bias 120 imposed on an individual optical switch element 125 by a respective controller bias control signal 175.

In step 520, the activation 490 of each of the output neurons 495 in the output layer 426 is compared to a desired output or label, here representing a switch setting 275.

If all the switch settings 275 represented by the activations 490 in the output activation pattern 480 are within a tolerance or validation accuracy 530 the training process 240 ends and the resulting DNN 400 can be used as a switch model 280 of the optical switch fabric 100.

If any of the switch settings 275 in the output activation pattern 480 are not valid, e.g. fall outside the tolerance, a backward propagation is performed 540 on the DNN 400 and the process 240 is repeated 550 with the same or a different data record 226 from the dataset 225.

Other embodiments of process 240 can be performed. For example, in an alternative embodiment, the DNN input values/features 410 of step 510 can be the switch settings 275 and other parameters 454 and the DNN output activation pattern 480 at the DNN output layer 426 can be the optical switch fiber outputs 155 as labels.

Figure 6:
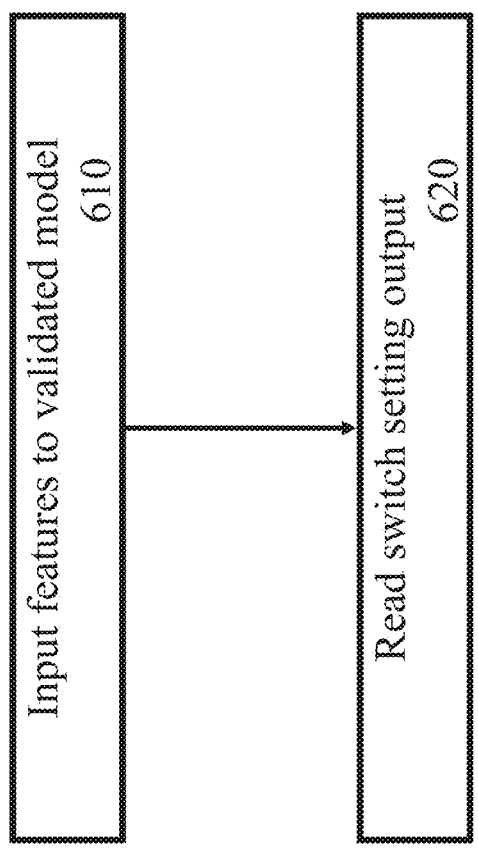
FIG. 6 is a flow chart of an inference process for predicting switch settings of the optical switch elements in the optical switch fabric.

FIG. 6 is a flow chart of an inference process 290 for predicting switch settings 275 of the optical switch elements 125 in the optical switch fabric 100 to configure a given output 155 of the optical switch fabric 100.

In step 610 of the inference process 290, the input features, e.g. a desired output configuration, are inputted into a validated model 280. Depending how the model 280 is configured, the input features 450 can include output values 155 from the optical switch fabric 100. In alternative model configurations other parameters (265, 454) also would be included in the input features 450.

Once the model 280 is validated, step 620 merely accesses the switch settings 275 from each individual activation 490 of the each of the output neurons 495 forming the output activation pattern 480 of the DNN 400. Using the present invention eliminates the work, complexity, and inaccuracies the prior art has in determining the switch settings 275.

In some embodiments, the switch setting 480 outputs from the switch model 280 can be inputted into switch control 150. The switch control 150 would use the switch setting outputs 480 to generate the controller bias control signal 175 to apply to each respective optical switch element 125 to automatically tune/reconfigure the entire optical switch fabric 100.

Figure 7:
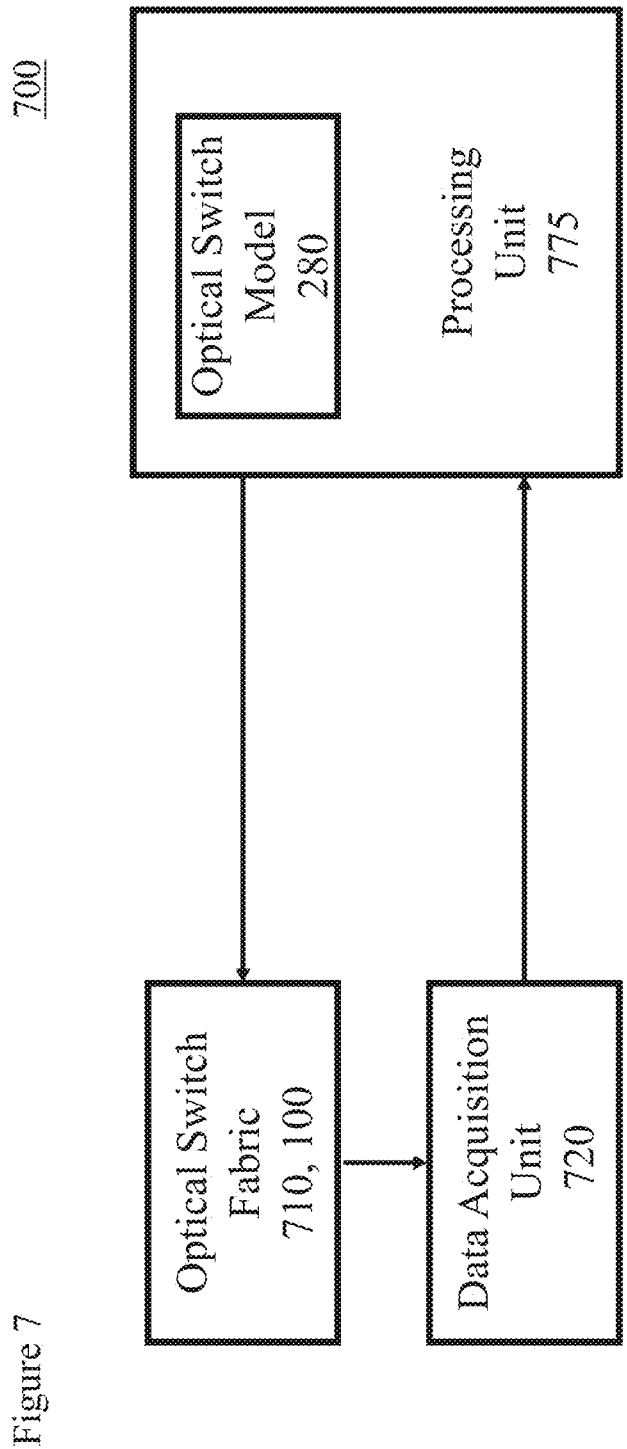
FIG. 7 is a block diagram of a system that provides continual learning to refine a given switch model.

FIG. 7 is a block diagram of a system 700 that provides continual learning to refine a given switch model 280.

In practice, the switch model 280 resulting from the method presented above can be provided by the optical switch fabric 100 module vendor. In some embodiments, the vendor would save the model network parameters (e.g. weights and offsets) in a nonvolatile memory. The model network parameters can be accessible to the switch controller 150.

Since the optical switch fabric 100 modules can be used in many various conditions, it is possible that the factory provided model network parameters would not satisfy every switch use or environment. To solve this problem, an aspect of the invention provides techniques for continual learning of the model 280 to reconfigure the model 280 for the new use.

In one embodiment, the system 700 comprises an optical switch fabric (710, 100) with factory settings, a data acquisition unit 720, a processing unit 775, and the switch model 280. The switch model 280 can be running on the processing unit 775 or running separately from the processing unit 775.

Initially the optical switch fabric (710, 100) is initialized by the switch settings 275 set in the factory by the switch provider.

Figure 8:
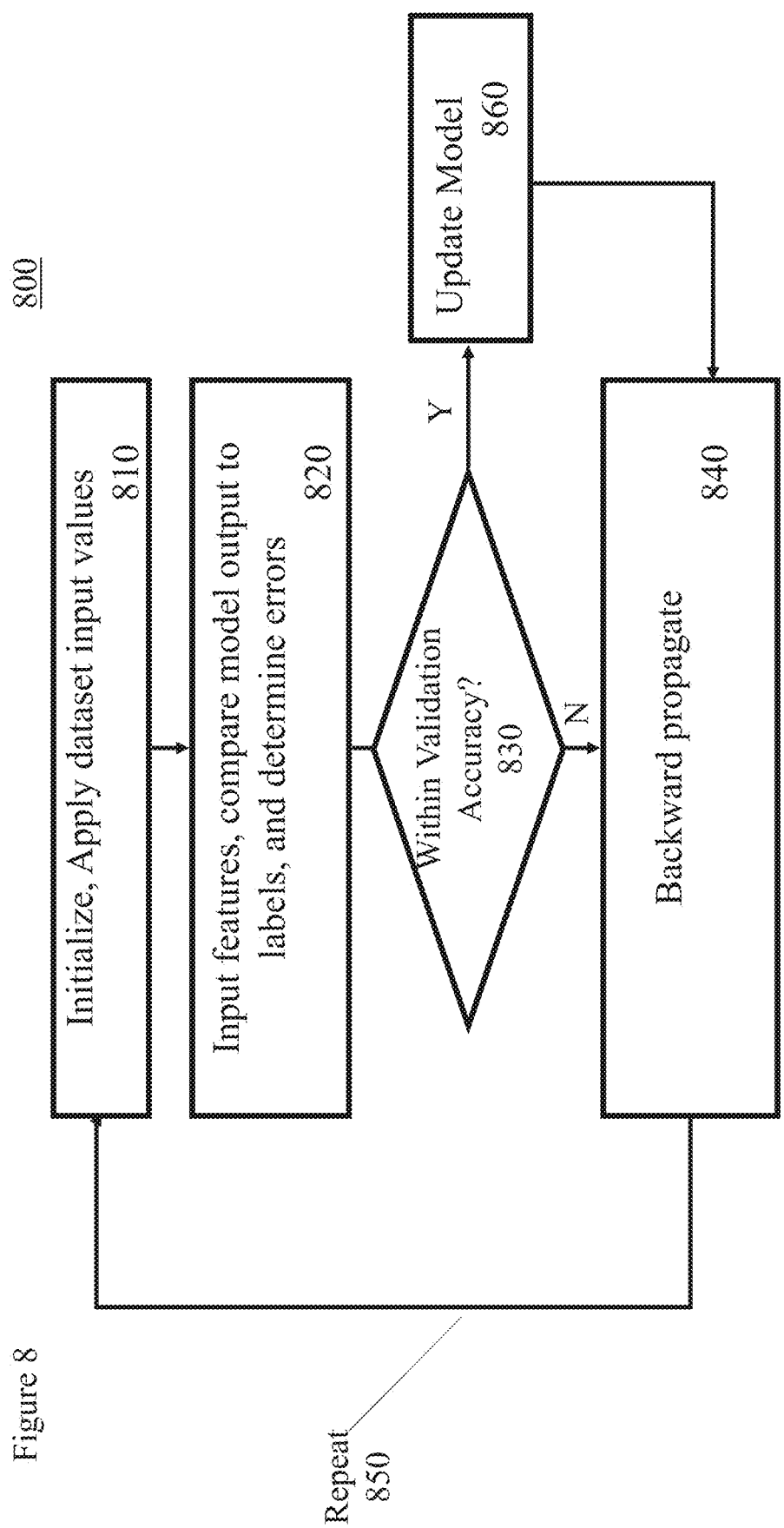
FIG. 8 is a process for continual learning.

Also refer to FIG. 8, a process for continual learning 800. In some embodiments, the continual learning process 800 runs in conjunction with system 700.

In step 810 of the process, the initial factory settings are read, e.g. by the switch controller 150. A model 280 is initialized with the factory settings (network parameters). For example, the model 280 is initialized with the factors like the weights, biases, and switch settings 275 (output pattern 490) set at the factory.

In step 820, the data acquisition system 720 acquires training/output data from the operation of the optical switch fabric 100. The output data from the operation is applied as input to the model 280.

In step 830 a validation comparison is done of the outputs of the model 280. If the switch settings 275 of the optical switch fabric 100 is not with validation accuracy a backward propagation is performed in step 840 as described above and steps 810, 820, and 830 are repeated 850 until validation accuracy is achieved. At that point, the factory settings of the model 280, e.g. model network parameters, are updated 860.

For example, when the optical switch fabric 100 is being used, the data acquisition unit 720 reads the training parameters (learned features) and labels of the switch, using for instance integrated photodetectors 180 to monitor the optical output power 155. The output power data 155 can then be fed to a machine-learning algorithm 400 also initialized with the in-factory model parameters and run on the processing unit 775. The system hence provides continual learning as the switch model 280 is continuously refined and adapted to the peculiar environment and conditions of the user application.

Figure 9:
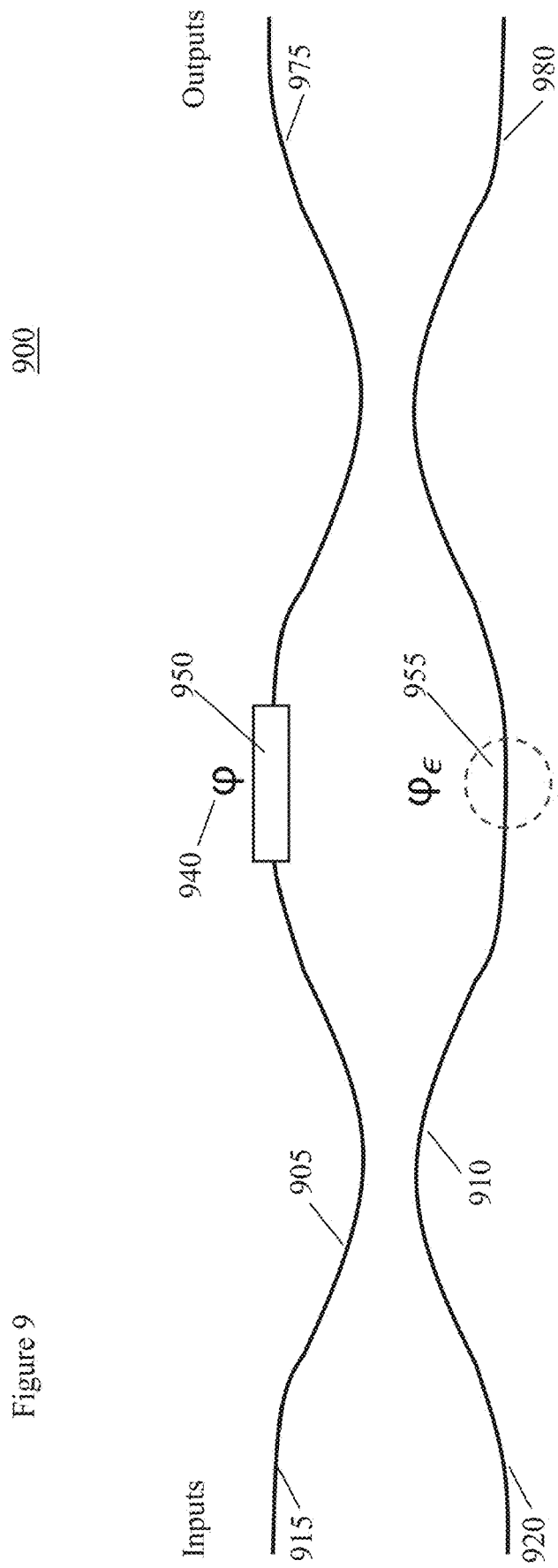
FIG. 9 is a schematic diagram of a 2×2 switch element, e.g. a Mach-Zehnder switch (MZS), with two optical paths with a delay with respect to each other.

FIG. 9 is a schematic diagram of a 2×2 switch element 900, e.g. a Mach-Zehnder Switch (MZS), with two optical paths and a delay with respect to each other.

The 2×2 MZS 900 is an interference-based device that includes a 2×2 input coupler that connects a first input or port 915 to a first optical path 905 and a second input or port 920 to a second optical path 910. The two optical paths (905, 910) are coupled in an input 2×2 coupler and again in an output 2×2 coupler and can have an optical phase delay with respect to each other.

The optical phase delay between the optical paths can be controlled by a phase controller 950 that changes the phase $\varphi$, 940. The switch 900 is normally used to route a signal entering input port 915 or 920 to the output port 975 or 980. The transmission characteristics of the switch cell are dictated by the value of the optical phase difference $\Delta\varphi=\varphi-\varphi_\epsilon$, with $\varphi_\epsilon$, the phase error 955, i.e. the optical phase difference between the upper 905 and lower 910 arms of the MZS when $\varphi=0$. Physically, qc is a fabrication related random phase error 955, and is generally uniformly distributed.

There are various existing technologies that can provide the phase shift $\varphi$, using for example thermo-optic or electrooptic effects. Note that the MZS cell could also use more than one phase controller 950, for example, each optical path (905, 910) can be equipped with its own phase controller 950.

Each optical switch element 125 in an optical switch fabric 100 can be a MZS. A Mach-Zehnder switch (MZS) fabric comprises a matrix arrangement of smaller 2×2 MZS that are connected following some topology 190.

FIG. 9 is now used as an example for introducing one possible implementation of the dataset generation, training, and inference processes introduced in FIG. 2. In this example, the optical switch fabric 100 is a simplistic 2×2 MZS fabric, in other words, a switch fabric that has only one switch cell 900. While the method 200 is used for much more complicated optical switch fabrics 100, application to the small switch fabric 900 highlight important features of MZS 900 fabrics configuration and optimization.

The output power transmission matrix of the 2×2 MZS 900 is:

$$M_{2\times 2} = \begin{bmatrix} m_{00} & m_{01} \\ m_{10} & m_{11} \end{bmatrix}$$

in which $m_{ij}$ refers to the measured power at the output port j, when a signal enters port i.

Figure 10A:
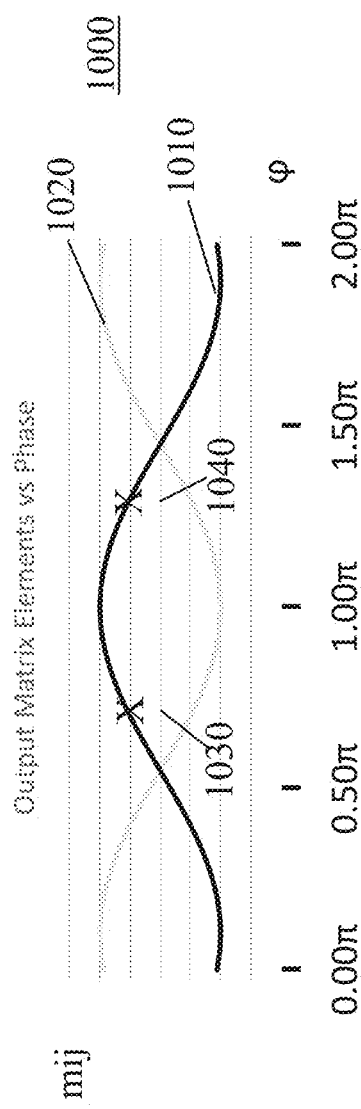
FIG. 10A is a plot of output power matrix elements versus optical phase shift for a 2×2 MZS.

Referring to FIG. 10A which is a plot 1000 of the output power matrix elements (the transmission of a 2×2 MZS) as a function of $\varphi$, optical phase shift 940. Assuming a perfectly power balanced MZS, the matrix $M_{2\times 2}$ is symmetric. In other words, in a perfectly power balanced MZS, the result is $m_{00}=m_{11}$ and therefore is represented as the single curve 1010, and $m_{10}=m_{01}$ as represented by the single curve 1020. As the phase $\varphi$ varies from 0 to $2\pi$, and the output power matrix elements are given by $\sin^2(\Delta\varphi/2-\varphi_\epsilon/2)$ and $\cos^2(\Delta\varphi/2-\varphi_\epsilon/2)$. (Note that in this simple example, these relationships, curves 1010 and 1020, are easily determined. For higher order matrices, the DNN techniques disclosed herein are used.)

Continuing with this simple example, in the dataset generation process 220 of process 200 the two transmission curves 1000 are experimentally generated by taking many random realizations of $\varphi$, phase shift 940, and saving the output power matrix elements $m_{ij}$. The matrix elements $m_{ij}$ (learned features) are then fed 250 into the input layer 450 of a DNN 400 to train the model 280 during the training process 240. In this embodiment, the $\varphi$, phase shift 940, is treated as the switch setting 275 (and/or bias control signal 175) and is an activation 490 (label) of an output neuron 495 in the output layer 426 of the DNN.

However, when using optical switch elements 125 that have a periodic nature, as in the case of MZS, difficulties arise in the datasets 225 created and the machine learning 250 step of the training process 240. As random values of e, phase shift 940, are generated by sweeping/selecting over the $\varphi$, phase shift 940, range of 0 to $2\pi$ radians, there are, for several $m_{ij}$ elements, two possible phase values. For example, the value of $m_{00}$ is the same, shown as an "X" for a first 1030 and second 1040 value of 4, phase shift 940.

This is a problem for the training 240, as the dataset 225 used to train 240 the DNN 400 is ambiguous. To solve this problem, more experimental data is gathered in the dataset 225 and provided to the training algorithm 240. The derivative, $\partial mij/\partial\varphi$, of the each of the transmission power elements $m_{ij}$ with respect to the phase is also provided to the dataset 225.

Figure 10B:
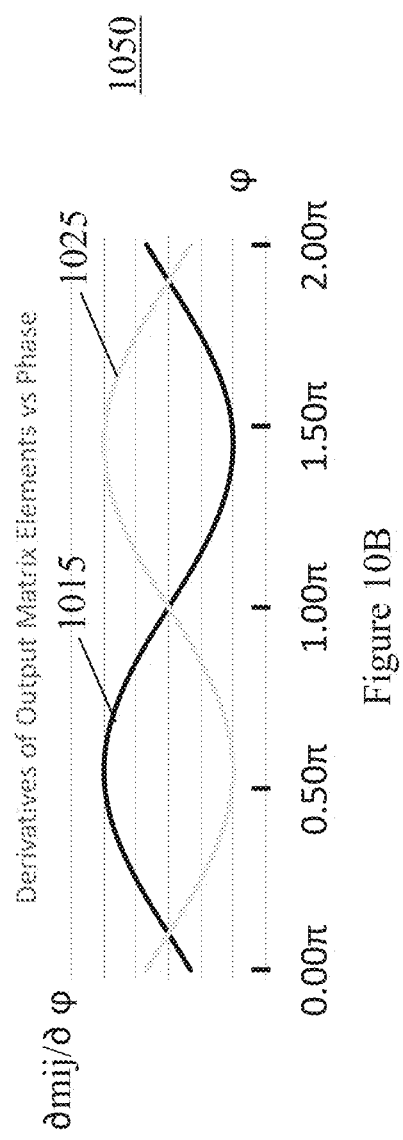
FIG. 10B is a plot of the derivatives of the output power matrix elements versus the optical phase shift for a 2×2 MZS.

Refer to FIG. 10B. The derivative curve 1015 corresponds to the phase curve 1010 and the derivative curve 1025 corresponds to phase curve 1020.

Other disambiguating information could be provided so long as each input 450 to the DNN 400 is unique. For example, instead of the derivative, the sign of the derivative can be used, e.g. the integers −1, 0, and 1 can represent negative, null, and positive derivatives, respectively.

As can be seen by inspection of the figure, output power matrix elements, mij, with equal values at different $\varphi$, optical phase shift 940, will have different values of derivatives. In this embodiment, each data point is now unique as each value of φ is now associated with a unique two-element set: (mij, ∂mij/∂φ).

In FIG. 10B, a plot of the derivatives, ∂mij/∂φ, of the output power matrix elements versus the φ, optical phase shift 940 for a 2×2 MZS. Note that similar to mij, ∂mij/∂φ can easily be measured on an optical switch fabric (100, 900).

Figure 11:
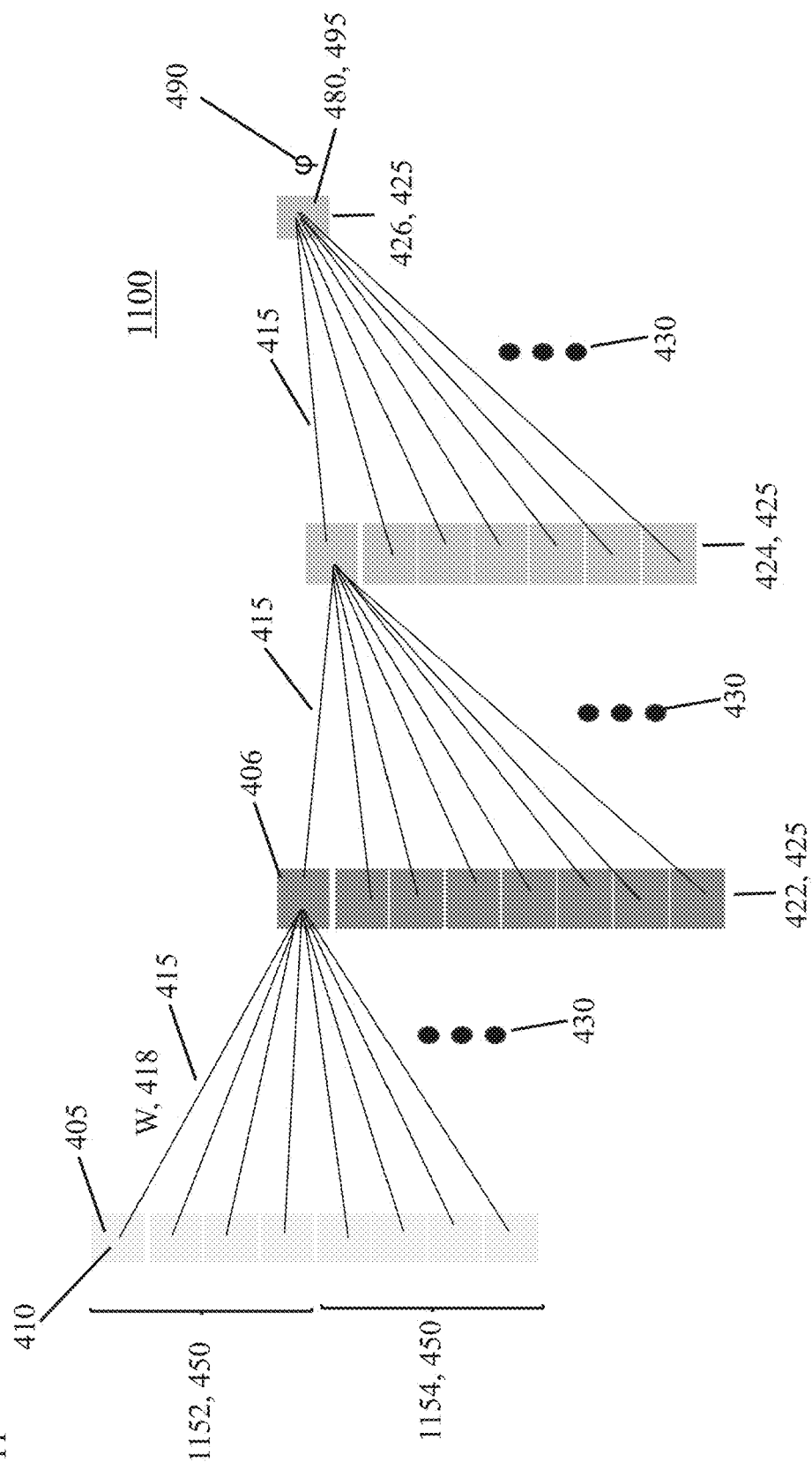
FIG. 11 is a diagram of one embodiment of a DNN for an example 2×2 MZS optical switch fabric using both output power matric elements and derivatives of these power matrix elements to predict a phase shift setting.

FIG. 11 is a diagram of one embodiment of a DNN 1100 for an example 2×2 MZS optical switch fabric 900 using both output power matric elements and derivatives of these power matrix elements to predict φ, the optical phase shift 940 for the MZS switch setting 275.

The DNN 1100 has an input layer 450 with 8 input neurons 405. Four of the input neurons 1152 each contain an input 410 (learned feature) that represents an output power element mi and four of the input neurons 1154 each contain an input 410 representing the derivative, ∂mij/∂φ, of the one of the respective transmission power elements mu.

The output layer 426 of DNN 1100 has a single output neuron 495 with an activation 490 representing φ, the optical phase shift 940 for the MZS switch setting 275 (label). The model 280 is created as described in the description of FIGS. 4 and 5 above. Once the model 280 created, the inference 290 follows the process described in FIG. 6.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. An optical switch fabric comprising:
   two or more optical switch elements, each optical switch element having a bias, one or more optical switch element inputs and one or more optical switch element outputs, one or more optical switch element outputs from a first optical switch element connected to one or more inputs of a second optical switch element so that the optical switch elements are optically connected in a topology;
   one or more inputs to the optical switch fabric, each input connected to one of the optical switch element inputs of an optical switch element at an input of the topology;
   one or more outputs from the optical switch fabric, each output connected to one of the optical switch element outputs of an optical switch element at an output of the topology; and
   a switch control with a plurality of bias control signals, the switch control capable of addressing one or more of the optical switch elements, being an addressed optical switch element, and switch control applying one of the bias control signals to the bias of the addressed optical switch element to establish a switch setting, where the switch setting is determined by a machine learning process and the switch settings and topology determine how each of one of the inputs is connected to each of one of the outputs.

2. The switch fabric, as in claim 1, where the machine learning process is performed by a deep neural network (DNN).

3. The switch fabric, as in claim 2, where the DNN is trained with a dataset, the dataset having a plurality of records, each record having output information for the optical switch fabric and switch settings for each of the optical switch elements.

4. The switch fabric, as in claim 3, where each record further comprises other information.

5. The switch fabric, as in claim 4, where the other information includes one or more of the following: operating temperature of the optical switch fabric, humidity, and ambient temperature.

6. The switch fabric, as in claim 1, where one or more of the optical switch elements is a 2×2 Mach-Zehnder switch (MZS).

7. The switch fabric, as in claim 6, where the bias control signal is applied to an optical phase shift control of the 2×2 MZS to control the switch setting.

8. The switch fabric, as in claim 6, where the machine learning process is performed by a deep neural network (DNN) trained with a dataset of a plurality of records, each record having output information, disambiguating information about the output information, and optical phase shifts as switch settings for each of the MZSs.

9. The switch fabric, as in claim 8, where the disambiguating information includes one or more of the following: derivatives of the output information, and representative information about the derivatives of the output information.

10. The switch fabric, as in claim 1, where the model parameters are updated during operation of the switch fabric.

11. The switch fabric, as in claim 10, where the model parameters are updated by changes to one or more outputs of a machine learning process.

12. A training process comprising the steps of:
   a. inputting learned feature information into one or more inputs of a machine learning system;
   b. comparing one or more outputs of the machine learning system to a desired label to determine a difference;
   c. using one or more of the differences to determine changes to one or more model parameters in the machine learning system;
   d. determining whether the differences are within a validation accuracy;
   e. if the differences are within the validation accuracy, using existing model parameters in the machine learning system as a model of an optical switch fabric;
   f. if the differences are not within the validation accuracy, backwardly propagating the changes to the model parameters through the machine learning system;
   g. repeating steps b through g until the differences are within the validation accuracy.

13. The process, as in claim 12, where the machine learning system is a Deep Neural Network (DNN).

14. The process, as in claim 12, where the learned feature information includes output values of an optical switch fabric and the labels are a switch setting for each of one or more optical switch elements connected in a topology to form the optical switch fabric.

15. The process, as in claim 14, where the learned feature information further comprises other parameters.

16. The process, as in claim 14, where the output values are updated by a data acquisition system monitoring an operation of the optical switch fabric and steps a through g are repeated with the updated output values to produce a new set of model parameters.

17. The process, as in claim 14, where the switch setting is an optical phase shift for a Mach-Zehnder switch (MZS).

18. The process, as in claim 17, where the learned feature information further comprises disambiguating information about the output values.

19. The process, as in claim 12, where the learned feature information includes a switch setting for each of one or more optical switch elements connected in a topology to form the optical switch fabric and the labels are output values of an optical switch fabric associated with switch settings.

20. An optical switch fabric system comprising:
   an optical switch fabric comprising:
      two or more optical switch elements, each optical switch element having a bias, one or more optical switch element inputs and one or more optical switch element outputs, one or more optical switch element outputs from a first optical switch element connected to one or more inputs of a second optical switch element so that the optical switch elements are optically connected in a topology;
      one or more inputs to the optical switch fabric, each input connected to one of the optical switch element inputs of an optical switch element on an input of the topology;
      one or more outputs from the optical switch fabric, each output connected to one of the optical switch element outputs of an optical switch element on an output of the topology;
      a switch control with a plurality of bias control signals, the switch control capable of addressing one or more of the optical switch elements being an addressed optical switch element and switch control applying one of the bias control signals to the bias of the addressed optical switch element to establish a switch setting, where the switch setting is determined by a machine learning process and the switch settings and the topology determining how one of the inputs is connected to one of the outputs;
   an optical switch model running on a processing unit;
   a data acquisition unit monitoring the outputs of the optical switch fabric, and providing one or more new output information to the optical switch model;
   machine learning process using the new output information to re-create the model to form a re-created model, the re-created model having update model parameters.

* * * * *